Sept. 27, 1927.
N. LINDBLAD
1,643,668
THERMOELECTRICAL MEASURING ARRANGEMENT
Filed Jan. 26, 1927
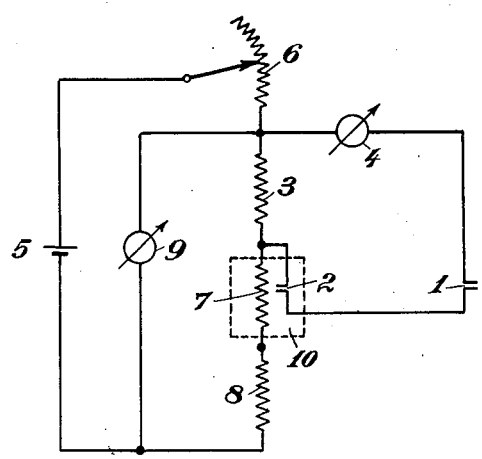
Inventor:
Nils Lindblad
by Locke, Kellenberg & Farley
Attorneys.

Patented Sept. 27, 1927.

1,643,668

UNITED STATES PATENT OFFICE.

NILS LINDBLAD, OF STOCKHOLM, SWEDEN, ASSIGNOR TO SIEMENS & HALSKE AKTIEN-GESELLSCHAFT, OF SIEMENSSTADT, NEAR BERLIN, GERMANY, A CORPORATION OF GERMANY.

THERMOELECTRICAL MEASURING ARRANGEMENT.

Application filed January 26, 1927, Serial No. 163,631, and in Germany June 20, 1925.

My invention relates to a new and useful arrangement for the measurement of temperatures by means of a thermo-couple. Arrangements of this type are well known in which a constant electro-motive force is impressed on the measuring instrument for increasing the sensitiveness within a narrow range. Thus the measuring instrument only indicates such temperatures which produce a thermo-electric voltage greater than the given voltage in the circuit. The auxiliary voltage may be taken from a voltage divider, that is, a pair of parallel circuits having different resistances.

Besides, it has been proposed to compensate for disturbing changes of the cold junction temperature by means of additional resistances placed near the cold junction.

According to the invention a voltage divider fed from an auxiliary source of current and connected to the measuring circuit is arranged in such a manner as to compensate for changes of the cold junction temperature. The improved arrangement has with respect to well known devices the advantage of great simplicity and accuracy of measurement. It will be understood that in the present system the variations of the voltage derived from the voltage divider are exactly proportional to the variations of the compensating portion of the voltage divider resistance. Hence, the last-named variations are proportional to the changes of the thermo-electric voltage caused by the changes of the cold junction temperature. Therefore a quite accurate compensation takes place throughout the total range of measurement.

A preferred form of the invention is illustrated in the accompanying drawing. 1 and 2 are the hot and the cold junctions of the thermo-couple. The thermo-electric current flows over a resistance 3 and through the measuring instrument 4 which indicates the temperature to be measured. The resistance 3 also is connected to the circuit of a voltage divider which comprises the source of current 5, the regulating resistance 6 and the resistances 3, 7 and 8. The apparatus is so arranged that the electromotive force of the battery 5 is, in the thermoelectric circuit, opposed to the electromotive force generated by the thermoelectric circuit itself. The regulating resistance 6 is adjusted so that the volt meter 9 lying at the outer ends of the series resistances 3, 7, 8 shows a predetermined deflection. The resistance 7 is made of a material having a positive temperature-coefficient, for instance copper, while the resistances 3 and 8 are suitably independent of temperature. I prefer to arrange the resistance 7 so near the cold junction 2 of the thermo-couple that both elements always have an equal temperature. If desired, these two parts may be enclosed in a common compartment or casing represented as a dotted line 10 in the drawing. The source of current 5 and the thermo-electric junctions are so arranged or polarized that under normal conditions they both tend to send a current through resistance 3 in the same direction. In other words, the potential fall across this resistance due to the source 5 is in the same direction as the potential fall across the same resistance due to the thermo-electric circuit. In the thermo-electric circuit itself, however, the source 5 and the hot and cold junctions 1 and 2 tend to send opposing currents under normal conditions. By "normal conditions" is meant any condition wherein the temperature of the hot junction is higher than that of the cold junction. This is true only where the instrument is used for measuring high temperatures. Under normal conditions, upon increase of the cold junction temperature the intensity of the thermo-electric current will decrease. In meantime the resistance 7 reaches a higher ohmic value and the intensity of current flowing through the resistances 3, 7, 8 decreases so that the effective voltage impressed on the measuring instrument 4 is not affected by temperature in the cold junction, since the temperature-coefficient of the resistance 7 is so chosen as to make the decrease of voltage at the ends of the resistance 3 equal to the decrease of the thermo-electric force resulting from a temperature of the cold junction being higher than normal.

What I claim and desire to be secured by Letters Patent is:

In an electric measuring system, a source of direct current having an external closed circuit, a variable resistance, a second resistance of substantially constant value, a third resistance having a positive temperature coefficient, said circuit including said variable resistance, said second resistance and said third resistance in series with said source, a voltmeter connected across said variable resistance and said source, a thermo-electric circuit connected across said second resistance and provided with hot and cold junctions, the potential fall across said second resistance due to said source being normally in the same direction as the potential fall across the same resistance due to the thermo-electric circuit, a measuring device in said thermo-electric circuit, said third resistance being arranged adjacent one of said junctions so as to be subjected to the same temperatures, and being adapted to proportionately diminish the current in said external closed circuit upon rise in temperature of said third resistance.

In testimony whereof I affix my signature.

NILS LINDBLAD.